(12) United States Patent
Ishida

(10) Patent No.: US 12,508,051 B2
(45) Date of Patent: Dec. 30, 2025

(54) PUNCTURE NEEDLE

(71) Applicant: Terumo Kabushiki Kaisha, Tokyo (JP)

(72) Inventor: Masahiro Ishida, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 18/348,804

(22) Filed: Jul. 7, 2023

(65) Prior Publication Data
US 2023/0346423 A1    Nov. 2, 2023

Related U.S. Application Data

(63) Continuation of application No. PCT/JP2022/001260, filed on Jan. 17, 2022.

(30) Foreign Application Priority Data

Jan. 19, 2021    (JP) .................... 2021-006129

(51) Int. Cl.
*A61B 17/34*    (2006.01)

(52) U.S. Cl.
CPC .. *A61B 17/3417* (2013.01); *A61B 2017/3456* (2013.01); *A61B 2017/347* (2013.01)

(58) Field of Classification Search
CPC .. A61B 2090/0801; A61B 2017/06052; A61B 17/3468; A61B 17/3417; A61B 17/3421; A61B 17/320016; A61B 17/32093; A61B 18/1477; A61B 17/32; A61B 17/3496; A61B 17/3494; A61B 17/34; A61B 17/3401; A61B 2017/347;
(Continued)

(56) References Cited

U.S. PATENT DOCUMENTS 5,292,310 A    3/1994    Yoon
5,578,053 A *  11/1996   Yoon .................. A61B 10/0233
                                                606/165
(Continued)

FOREIGN PATENT DOCUMENTS

CN    2824854 Y    10/2006
CN    203663173 U    6/2014
(Continued)

OTHER PUBLICATIONS

Written Opinion of the International Searching Authority issued in the corresponding International Patent Application No. PCT/JP2022/001260, dated Mar. 15, 2022 (with English translation).
(Continued)

*Primary Examiner* — Katherine Shi

(74) *Attorney, Agent, or Firm* — Foley & Lardner LLP

(57) ABSTRACT

A puncture needle includes: an outer needle including a lumen extending in an axial direction; an outer needle hub joined to a proximal end portion of the outer needle; an inner needle located in the lumen of the outer needle; a switching mechanism configured to switch between a first state in which a needle tip of the puncture needle is sharp and a second state in which the needle tip of the puncture needle is blunt by displacing the inner needle in the axial direction; and a lock mechanism that maintains a position of the inner needle.

13 Claims, 15 Drawing Sheets

(58) Field of Classification Search
CPC .......... A61B 2017/3456; A61M 5/158; A61M 25/0612; A61M 25/065; A61M 25/0643; A61M 5/3202
See application file for complete search history.

(56) References Cited

U.S. PATENT DOCUMENTS

| | | | |
|---|---|---|---|
| 8,382,772 B2 | 2/2013 | Rotella et al. | |
| 10,702,263 B2 | 7/2020 | Heneveld | |
| 2004/0176730 A1 | 9/2004 | Wang | |
| 2009/0275970 A1* | 11/2009 | Leibowitz | A61B 17/3496 606/185 |
| 2015/0265777 A1* | 9/2015 | Whitley | A61B 17/3496 604/512 |

FOREIGN PATENT DOCUMENTS

| | | |
|---|---|---|
| CN | 110251213 A | 9/2019 |
| JP | H02-143947 U | 12/1990 |
| JP | 2002-253670 A | 9/2002 |
| JP | 2009-201539 A | 9/2009 |
| JP | 2009-261589 A | 11/2009 |
| JP | 2017-042226 A | 3/2017 |
| JP | 3227041 U | 7/2020 |
| JP | 2020-127607 A | 8/2020 |
| WO | WO-2018181195 A1 * 10/2018 ........ A61M 25/0068 |
| WO | WO-2020/016981 A1 | 1/2020 |

OTHER PUBLICATIONS

International Search Report issued in the corresponding International Patent Application No. PCT/JP2022/001260, dated Mar. 15, 2022.
Written Opinion of the International Searching Authority issued in the corresponding International Patent Application No. PCT/JP2022/001260, dated Mar. 15, 2022.
Extended European Search Report issued in EP Application No. 22742527.9 on May 15, 2024.

* cited by examiner

DISTAL END ←——→ PROXIMAL END

DISTAL END ←——→ PROXIMAL END

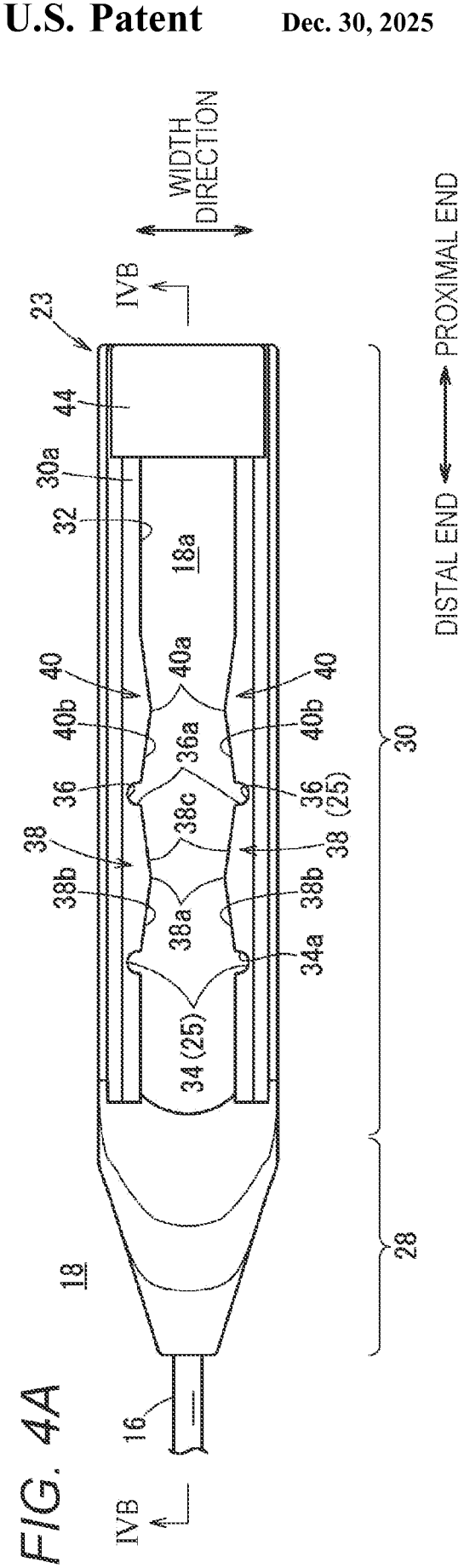
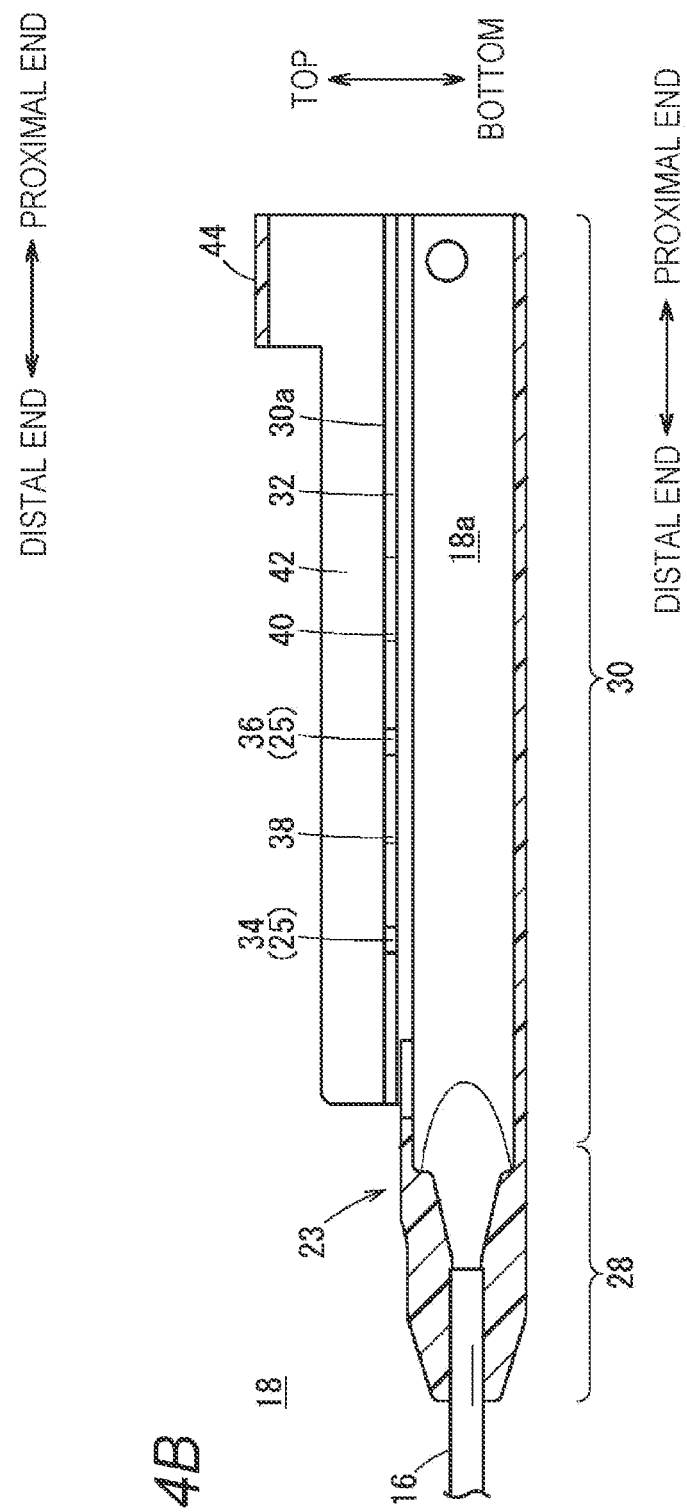
FIG. 4A
FIG. 4B

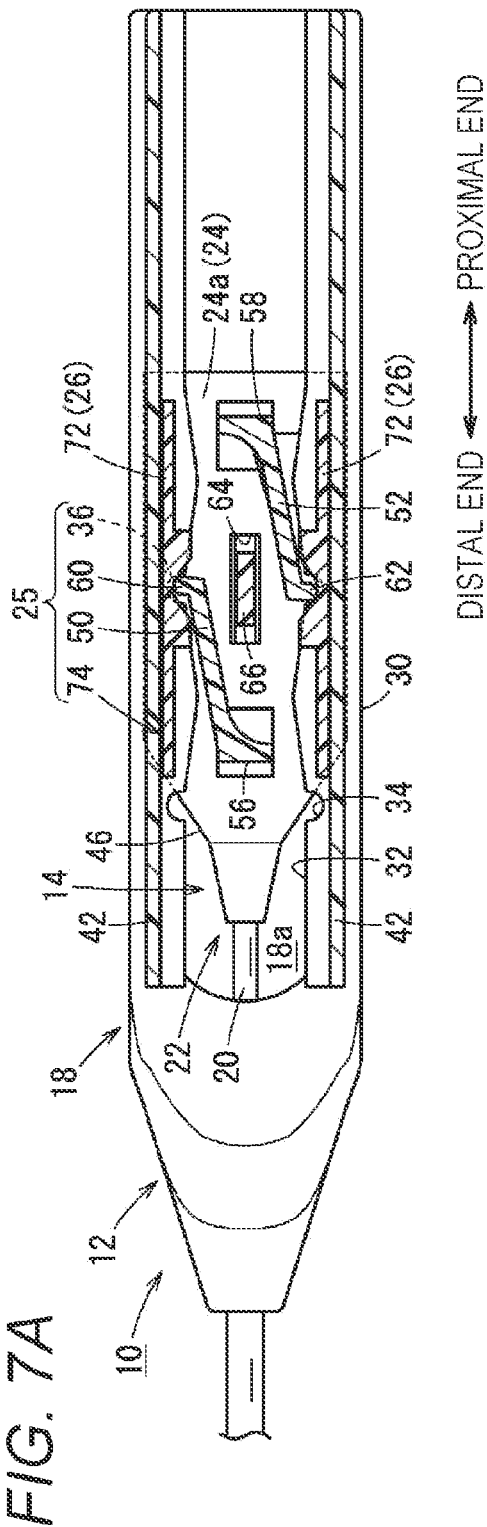
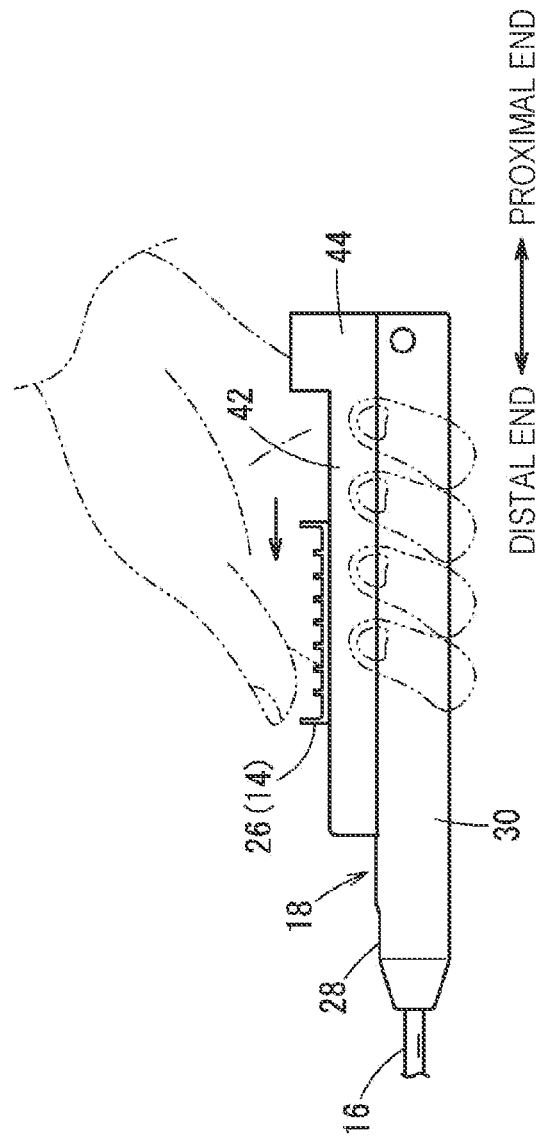
FIG. 7A
FIG. 7B

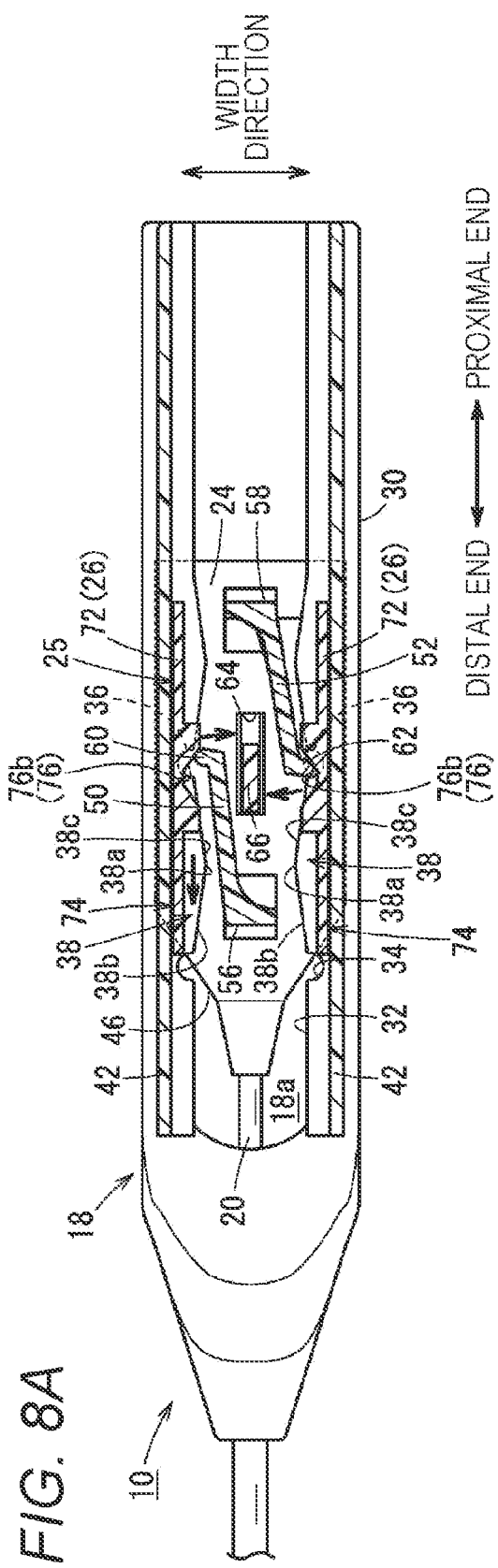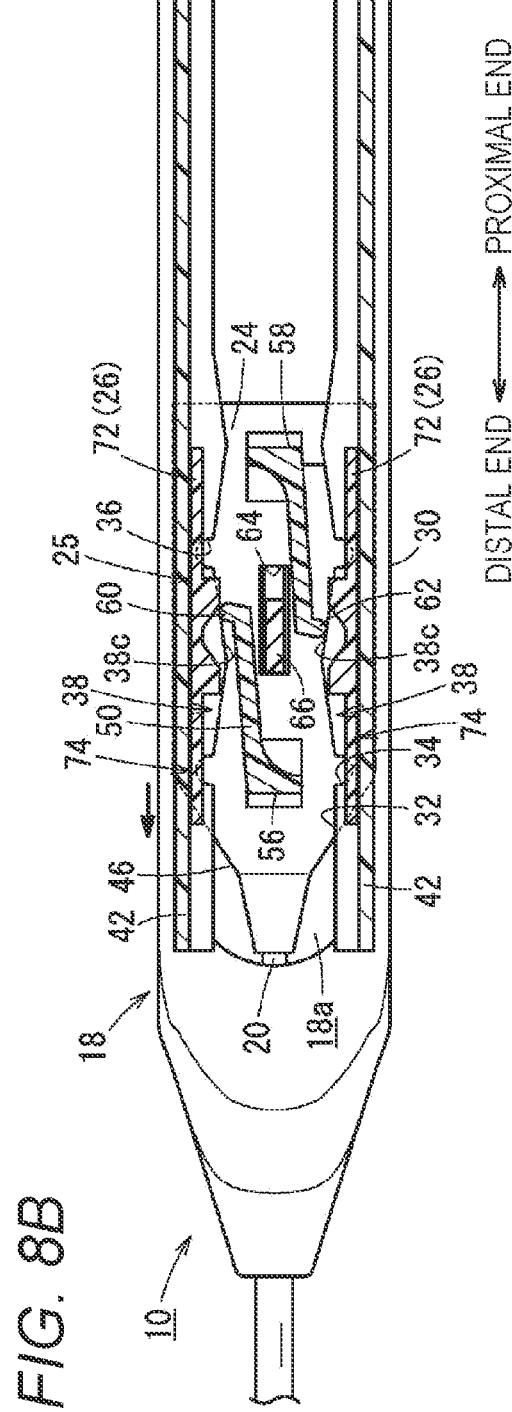

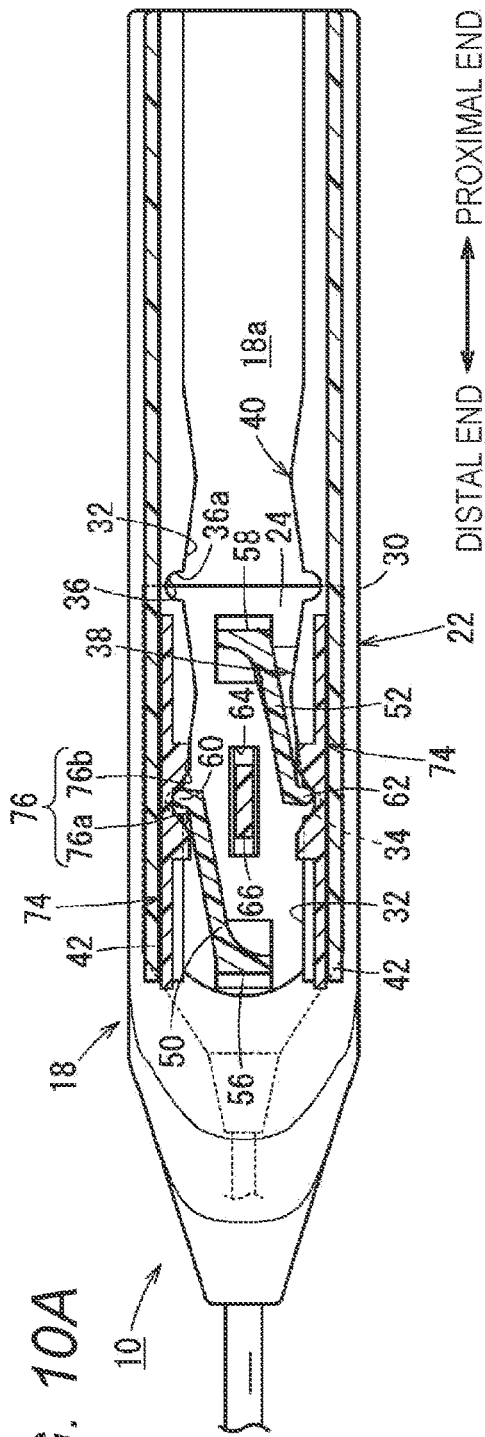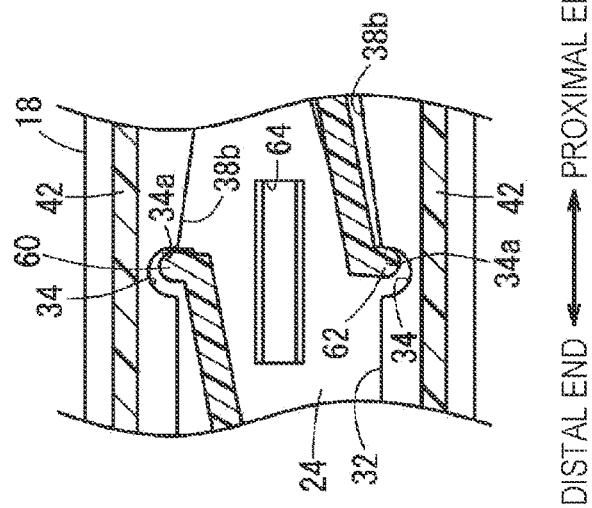

DISTAL END ⬅➡ PROXIMAL END

DISTAL END ⬅➡ PROXIMAL END

PUNCTURE NEEDLE

CROSS-REFERENCE TO RELATED APPLICATIONS

This is a bypass continuation of PCT Application No. PCT/JP2022/001260, filed on Jan. 17, 2022, which claims priority to Japanese Application No. JP2021-006129, filed on Jan. 19, 2021. The contents of these application are incorporated herein by reference in their entireties.

BACKGROUND

The present invention relates to a puncture needle for forming a long hole in a living tissue.

Conventionally, various medical instruments for forming a long hole in a living tissue have been proposed. For example, U.S. Pat. No. 10,702,263 describes a suture thread guide subsystem for penetrating living tissue and introducing a suture thread to a site to be sutured in a living body.

JP 3227041 U describes a tunnel for forming a tunnel in a living body and introducing a medium such as an artificial blood vessel into the living body.

JP 2020-127607 A proposes an indwelling instrument for indwelling an implanted body that promotes tissue regeneration in a living tissue.

The above instrument has a sharp or blunt-shaped needle tip to be punctured into a living tissue at a distal end of a long tubular puncture member.

SUMMARY

In a case in which the puncture needle penetrates the skin or a fiberized hard tissue, if the tip is sharp, puncture becomes easy and damage to the surrounding tissue is reduced. On the other hand, in a case in which the puncture needle penetrates a soft tissue such as an adipose tissue, it is preferable that the tip is blunt from the viewpoint of preventing damage to peripheral blood vessels, nerves, and the like.

Therefore, an object of certain embodiments of the present disclosure is to provide a puncture needle capable of suppressing damage to a living tissue at the time of puncturing.

One aspect of the following disclosure is a puncture needle including: an outer needle including a lumen extending in an axial direction; an outer needle hub joined to a proximal end portion of the outer needle; an inner needle inserted into the lumen of the outer needle via the outer needle hub; a switching mechanism capable of switching between a first state in which a needle tip is sharp and a second state in which the needle tip is blunt by displacing the inner needle in the axial direction; and a lock mechanism that maintains a position of the inner needle.

According to the puncture needle of the above aspect, it is possible to suppress damage to a living tissue at the time of puncturing.

BRIEF DESCRIPTION OF THE DRAWINGS

FIG. 4A is a top view of an outer needle hub, and FIG. 4B is a cross-sectional view of the outer needle hub taken along line IVB-IVB in FIG. 4A.

FIG. 7A is a cross-sectional view illustrating an arrangement relationship of the inner needle hub and the outer needle hub in an initial state, and FIG. 7B is an explanatory view illustrating an operation of protruding the inner needle hub from the initial state.

FIG. 8A is a cross-sectional view of a state in which the slider is advanced toward a distal end side from the state of FIG. 7A to release engagement between a stopper projection and a second recess, and FIG. 8B is a cross-sectional view of a state in which the slider is further advanced toward the distal end side from the state of FIG. 8A.

FIG. 10A is a cross-sectional view illustrating an arrangement relationship between the inner needle hub and the outer needle hub at the first position, and FIG. 10B is an enlarged cross-sectional view illustrating an engagement state of the stopper projection and the first recess in FIG. 10A.

DETAILED DESCRIPTION

Hereinafter, a preferred embodiment of a puncture needle 10 will be described in detail with reference to the accompanying drawings.

Figure 1:
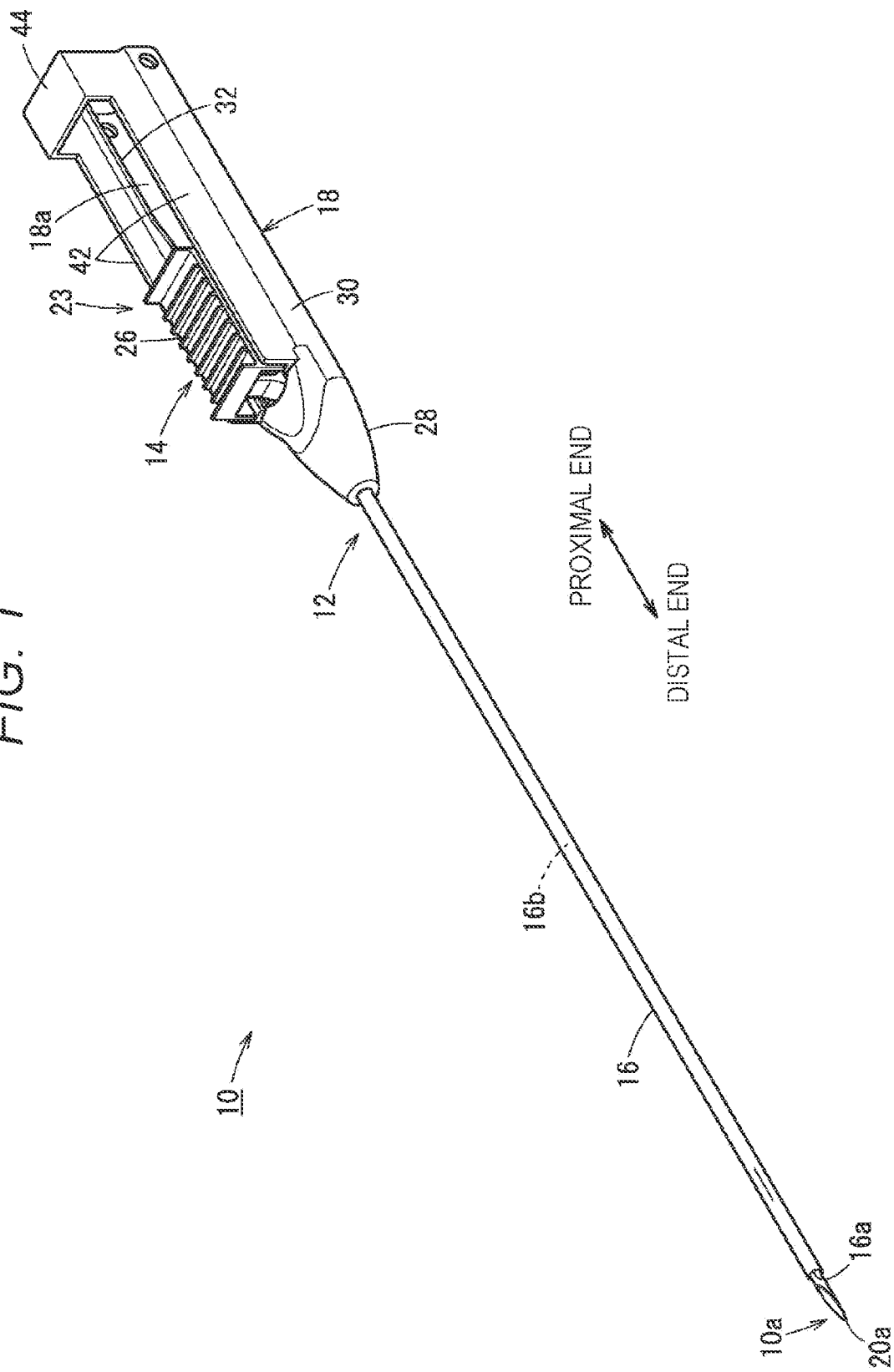
FIG. 1 is a perspective view of a puncture needle according to a first embodiment.
Figure 2:
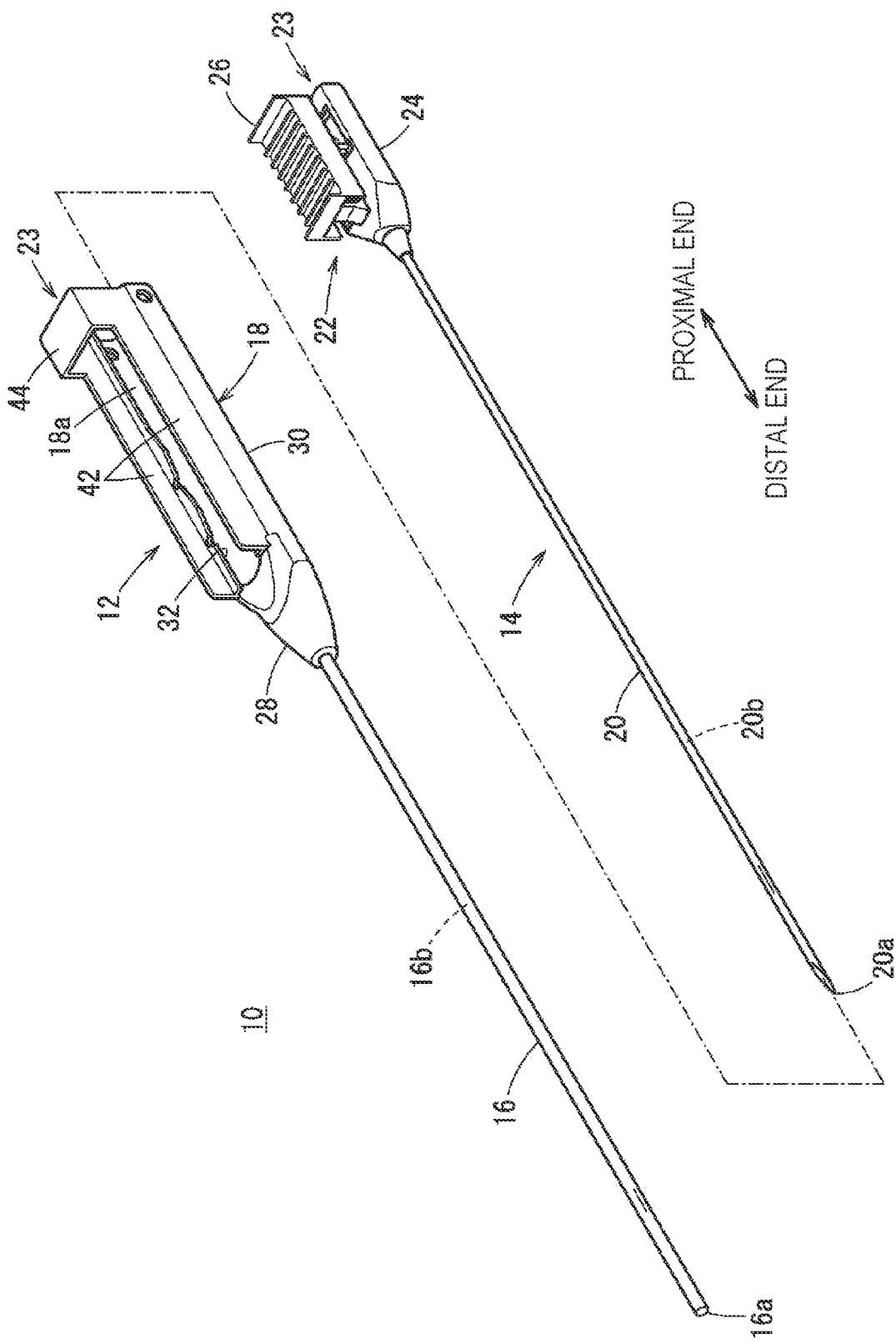
FIG. 2 is a perspective view of a state in which an outer needle assembly and an inner needle assembly of the puncture needle of FIG. 1 are separated.

As illustrated in FIGS. 1 and 2, the puncture needle 10 according to the embodiment includes an outer needle assembly 12 and an inner needle assembly 14. The inner needle assembly 14 is disposed to be insertable into and removable from the outer needle assembly 12 from a proximal end side of the outer needle assembly 12. The puncture needle 10 is used by puncturing from a skin 100 (see FIG. 11A) of a patient (living body) to a target site in a living tissue in a state in which the inner needle assembly 14 is attached. After completion of puncture, the inner needle assembly 14 is removed from the puncture needle 10, and the outer needle assembly 12 is used for introduction of an implanted body 90 (see FIG. 13A) such as an artificial blood vessel and collagen fibers.

As illustrated in FIG. 2, the outer needle assembly 12 includes an elongated outer needle 16. The outer needle 16 is a cylindrical member made of a metal such as stainless steel, an aluminum alloy, or a titanium alloy, a hard resin, or the like. A distal end portion 16a of the outer needle 16 is formed substantially perpendicular to an axial direction and is a blunt needle. Inside the outer needle 16, a lumen 16b is formed extending through the outer needle 16 in the axial direction.

An outer needle hub 18 is connected to a proximal end of the outer needle 16. The outer needle hub 18 is a tubular member made of a resin such as polycarbonate, for example, and is formed to have an outer diameter dimension that allows a user to easily grip and operate the outer needle hub by hand. A cavity 18a extending in the axial direction is formed inside the outer needle hub 18. A distal end side of the cavity 18a communicates with the lumen 16b of the outer needle 16, and a proximal end side of the cavity 18a opens at a proximal end portion of the outer needle hub 18. The cavity 18a extends in the axial direction and guides a sliding operation of an inner needle hub 22 described below. Details of a structure of the outer needle hub 18 will be described below.

On the other hand, the inner needle assembly 14 includes an elongated inner needle 20. The inner needle 20 is an elongated cylindrical member, and is formed of, for example, metal such as stainless steel. The inner needle 20 is formed to have an outer diameter smaller than that of the lumen 16b of the outer needle 16, and can be inserted into the lumen 16b. The inner needle 20 is a hollow needle in which a lumen 20b is formed. Note that the inner needle 20 may be a solid needle having a solid inside. A distal end portion 20a of the inner needle 20 is formed to be sharp.

Figure 3A:
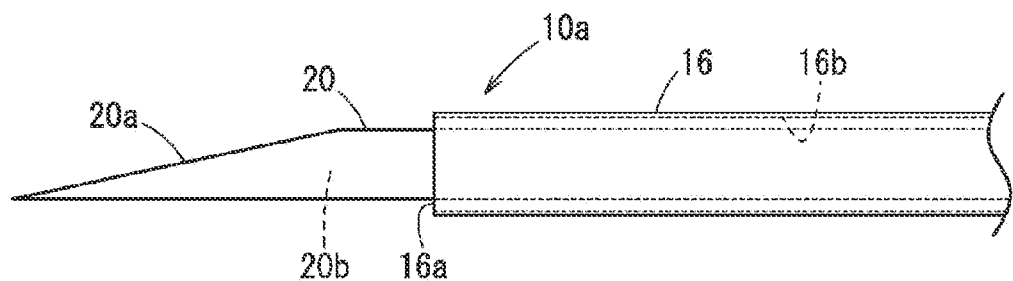
FIG. 3A is an enlarged view of a needle tip of the puncture needle of FIG. 1 in a first state (sharp)
Figure 3B:
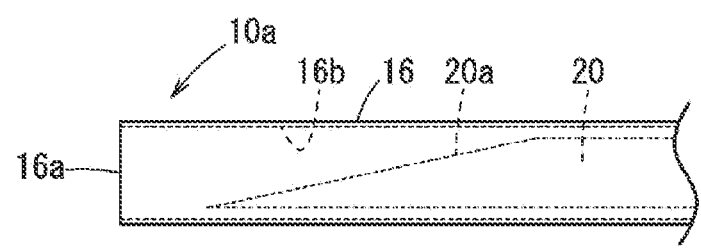
FIG. 3B is an enlarged view of the needle tip of the puncture needle of FIG. 1 in a second state (blunt).

As illustrated in FIG. 3A, the distal end portion 20a is formed with a blade surface cut obliquely with respect to the axial direction, and a sharp blade edge is formed at a distal end of the blade surface. The inner needle 20 is formed to be longer than the outer needle 16. When the inner needle assembly 14 in FIG. 1 is pushed toward the distal end side of the outer needle assembly 12, the distal end portion 20a of the inner needle 20 protrudes from the distal end portion 16a of the outer needle 16 as illustrated in FIG. 3A, and a needle tip 10a of the puncture needle 10 enters a sharp first state. Furthermore, when the inner needle assembly 14 in FIG. 1 is moved to the proximal end side of the outer needle assembly 12, the distal end portion 20a of the inner needle 20 is drawn into the distal end portion 16a of the outer needle 16 as illustrated in FIG. 3B, and the needle tip 10a of the puncture needle 10 is in a blunt second state.

As illustrated in FIG. 2, the inner needle hub 22 is provided at a proximal end of the inner needle 20 in order to operate the inner needle assembly 14. The inner needle hub 22 includes a needle holding portion 24 joined to the inner needle 20, and a slider 26 attached to the needle holding portion 24. The needle holding portion 24 of the inner needle hub 22 is disposed inside the cavity 18a of the outer needle hub 18, and slides in the axial direction inside the cavity 18a.

The outer needle hub 18 and the inner needle hub 22 constitute a switching mechanism 23 that switches the needle tip 10a of the puncture needle 10 between the sharp first state and the blunt second state. Details of the switching mechanism 23 will be described below.

As illustrated in FIGS. 4A and 4B, a connecting portion 28 for holding the outer needle 16 is formed in the vicinity of a distal end of the outer needle hub 18. The connecting portion 28 is formed in a funnel shape in which an outer dimension gradually increases from the distal end side toward the proximal end side. An outer needle hub body 30 formed in a tubular shape having a rectangular cross section is formed on a proximal end side of the connecting portion 28. The outer needle hub body 30 is formed to be elongated in the axial direction. In the outer needle hub body 30, the cavity 18a extends in the axial direction while maintaining a constant width.

As illustrated in FIG. 4A, a guide groove 32 is formed in an upper end portion 30a of the outer needle hub body 30. As illustrated in FIG. 4A, the guide groove 32 is formed to penetrate the upper end portion 30a of the outer needle hub body 30 in a thickness direction (a vertical direction, which is a direction perpendicular to a paper surface in FIG. 4A), and the cavity 18a opens to the upper end portion 30a through the guide groove 32. As illustrated in FIG. 4B, the guide groove 32 extends in the axial direction, and extends to a proximal end of the outer needle hub body 30. Stopper projections 60 and 62 of the needle holding portion 24, described below, slide in contact with the guide groove 32.

The guide groove 32 is provided with a first recess 34, a second recess 36, a first convex portion 38, and a second convex portion 40. These structures constitute a part of a lock mechanism 25 that positions the needle tip 10a in the first state of FIG. 3A or the second state of FIG. 3B. The first recess 34 is formed so as to be recessed toward an outside of the guide groove 32, and a pair of the first recesses is provided on both side portions of the guide groove 32. The first recess 34 is formed in a semicircular shape, and step portions 34a perpendicular to the axial direction are formed at end portions on the proximal end side and the distal end side in order to fix the needle holding portion 24 (see FIG. 10B).

The second recess 36 is formed on the proximal end side of the first recess 34. The second recess 36 is formed in a semicircular shape similar to that of the first recess 34, and a pair of the second recesses is provided on both side portions of the guide groove 32. Step portions 36a perpendicular to the axial direction are formed at end portions on the proximal end side and the distal end side of the second recess 36. The first recess 34, the second recess 36, and stopper projections 60 and 62 (see FIG. 5B) to be described below constitute the lock mechanism 25 that fixes the puncture needle 10 between the first state and the second state.

The guide groove 32 between the first recess 34 and the second recess 36 is provided with a pair of first convex portions 38 protruding inward in the width direction from both side portions of the guide groove 32. Each of the first convex portions 38 has a top portion 38a formed at an intermediate position in the axial direction between the first recess 34 and the second recess 36. An inclined surface 38b is formed between the top portion 38a and the first recess 34. The inclined surface 38b is inclined such that a width of the guide groove 32 increases from the top portion 38a toward the first recess 34. Furthermore, an inclined surface 38c is formed between the top portion 38a and the second recess 36. The inclined surface 38c is inclined such that the width of the guide groove 32 increases from the top portion 38a toward the second recess 36.

The guide groove 32 on a proximal end side of the second recess 36 is formed with second convex portions 40 protruding inward in the width direction from both side portions of the guide groove 32. Each of the second convex portions 40 has a top portion 40a. An inclined surface 40b is formed between the top portion 40a and the second recess 36. The inclined surface 40b is inclined such that the width of the guide groove 32 increases from the top portion 40a toward the second recess 36.

As illustrated in FIGS. 2 and 4B, a pair of guide plates 42 is provided in an upper portion of the outer needle hub body 30 so as to protrude upward. The guide plates 42 are provided near both side portions of the outer needle hub body 30 so as to sandwich the guide groove 32 from the width direction. Each of the guide plates 42 extends to the proximal end in the axial direction. The slider 26 of the inner needle hub 22 is disposed between the guide plates 42. The guide plate 42 guides the movement of the slider 26 in the axial direction. A proximal end portion of the guide plate 42 is provided with a bridge portion 44 that connects the guide plates 42 on both sides. The bridge portion 44 protrudes upward, and the inner needle hub 22 can be inserted from the proximal end side of the outer needle hub body 30 through a gap in a lower portion of the bridge portion.

Figure 5A:
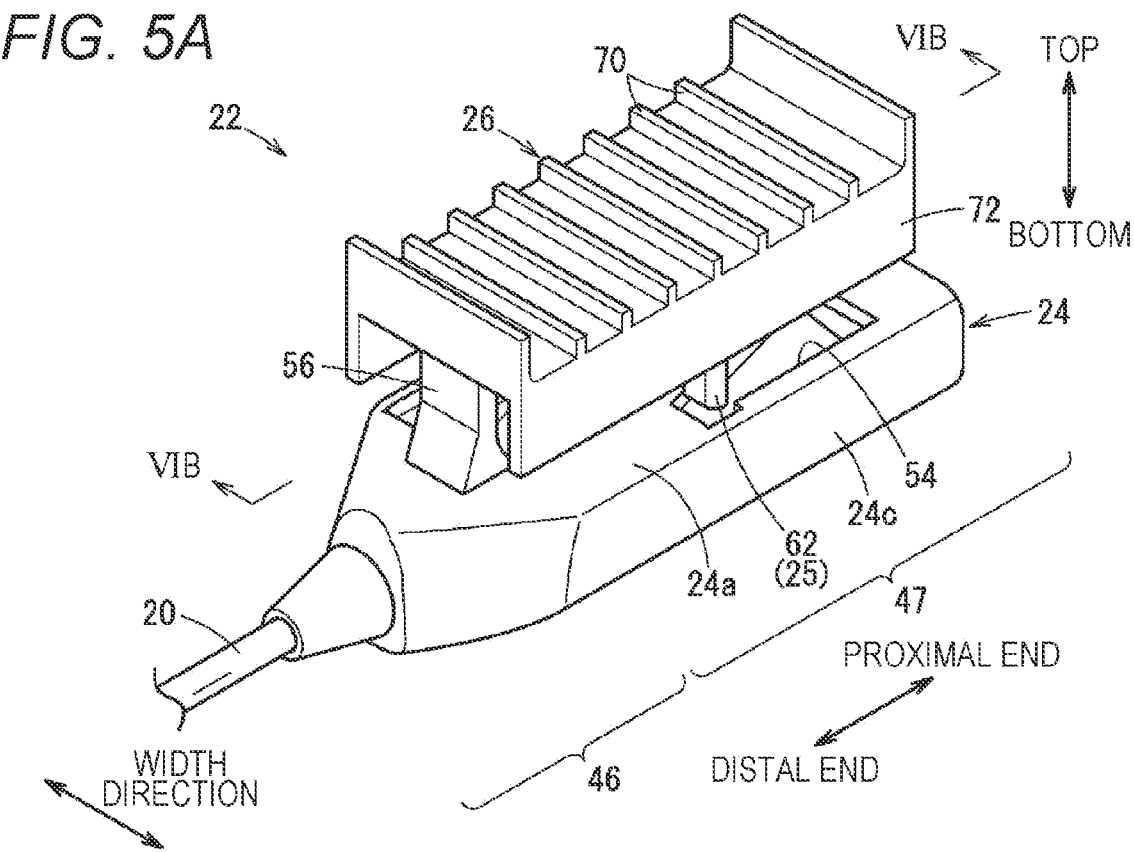
FIG. 5A is a perspective view of an inner needle hub.

Next, the inner needle hub 22 constituting another part of the switching mechanism 23 will be described. The inner needle hub 22 is a member joined to the proximal end of the inner needle 20, and is formed of a hard resin such as polycarbonate. As illustrated in FIG. 5A, the inner needle hub 22 includes the needle holding portion 24 that can be inserted into the guide groove 32 of the outer needle hub body 30 and the slider 26 provided above the needle holding portion 24.

The needle holding portion 24 is a member connected to the inner needle 20. The needle holding portion 24 includes an inner needle connection portion 46 and a needle holding body portion 47. The inner needle connection portion 46 to which the inner needle 20 is connected is formed on the distal end side of the needle holding portion 24. The inner needle connection portion 46 is formed in a tapered shape such that the width decreases toward the distal end. On a proximal end side of the inner needle connection portion 46, the needle holding body portion 47 linearly extending toward the proximal end side with a constant width is integrally formed with the inner needle connection portion 46. A width of the needle holding body portion 47 is formed to be substantially the same as a width of the cavity 18a of the outer needle hub body 30, and it can slide in the cavity 18a in the axial direction.

Figure 5B:
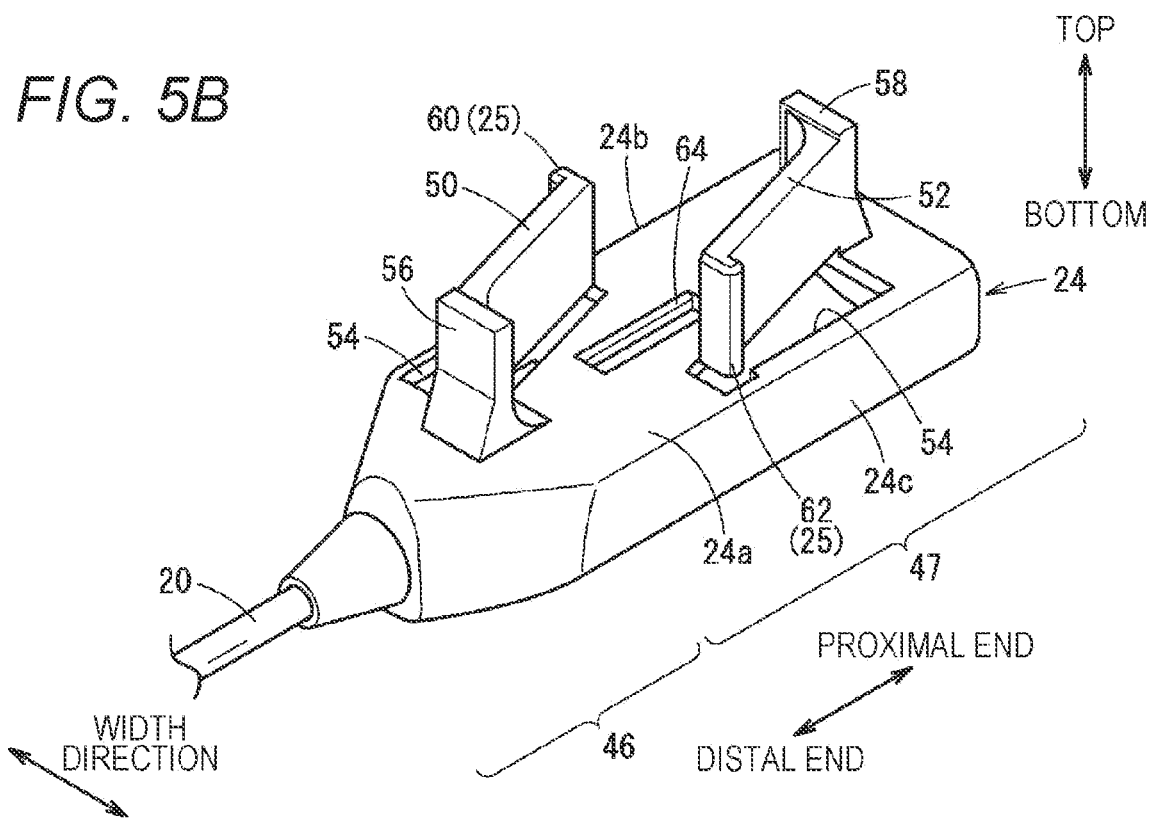
FIG. 5B is a perspective view of a needle holding portion.

As illustrated in FIG. 5B, the needle holding portion 24 has a rectangular cross section, and a first arm 50 and a second arm 52 are provided to protrude upward from an upper end portion 24a thereof. The first arm 50 and the second arm 52 are formed to protrude in a wall shape above the needle holding portion 24, and are separated from the needle holding portion 24 by notch portions 54. The first arm 50 is joined to the needle holding portion 24 through a support portion 56 provided on the distal end side of the needle holding portion 24 and extends toward the proximal end side. The first arm 50 is inclined so as to approach one side portion 24b from the support portion 56 toward the proximal end side. The stopper projection 60 protruding laterally is formed at a proximal end of the first arm 50.

The second arm 52 is joined to the needle holding portion 24 through a support portion 58 provided on the proximal end side of the needle holding portion 24. The second arm 52 extends toward a distal end side from the support portion 58 at a central portion in the width direction of the needle holding portion 24. The second arm 52 is inclined so as to approach the other side portion 24c from the support portion 58 toward the distal end side. The stopper projection 62 protruding laterally is formed at a distal end of the second arm 52.

The stopper projection 60 of the first arm 50 and the stopper projection 62 of the second arm 52 are formed at the same position in the axial direction of the needle holding portion 24. A separation distance in the width direction between the stopper projection 60 of the first arm 50 and the stopper projection 62 of the second arm 52 is formed to be larger than a gap in the width direction of the guide groove 32 of the outer needle hub body 30. Therefore, when the needle holding portion 24 is inserted into the outer needle hub body 30, the stopper projection 60 and the stopper projection 62 abut on the guide groove 32. The stopper projection 60 is pressed against the guide groove 32 by an elastic restoring force of the first arm 50, and the stopper projection 62 is pressed against the guide groove 32 by an elastic restoring force of the second arm 52.

A rectangular attachment hole 64 elongated in the axial direction is formed in a central portion (between the first arm 50 and the second arm 52) of the upper end portion 24a of the needle holding portion 24. An attachment projection 66 of the slider 26 illustrated in FIG. 6A is inserted into the attachment hole 64.

As illustrated in FIG. 1, the slider 26 is a member that is disposed between the pair of guide plates 42 on the upper portion of the outer needle hub body 30 and slides, and is displaced by receiving an operating force of the user. The slider 26 is disposed between the guide plates 42. As illustrated in FIG. 5A, an anti-slip rib structure 70 is formed on an upper portion of the slider 26.

Figure 6A:
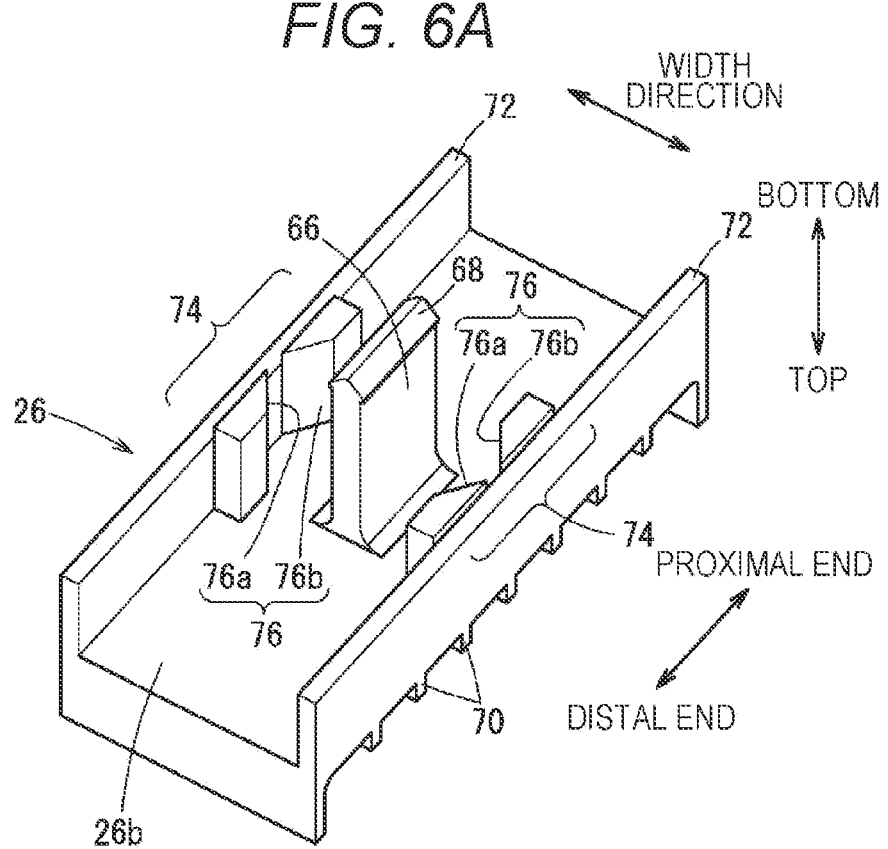
FIG. 6A is a perspective view of a bottom surface side of a slider.

As illustrated in FIG. 6A, a pair of side wall portions 72 is formed to protrude from both side portions of a bottom portion 26b of the slider 26. On each of the side wall portions 72, a release projection 74 that abuts on the stopper projection 60 or 62 (see FIG. 5B) is formed so as to protrude inward in the width direction. Each release projection 74 is provided with a tapered portion 76 including inclined surfaces 76a and 76b and accommodating the stopper projection 60 or 62. Furthermore, the attachment projection 66 protrudes from a central portion of the bottom portion 26b of the slider 26.

Figure 6B:
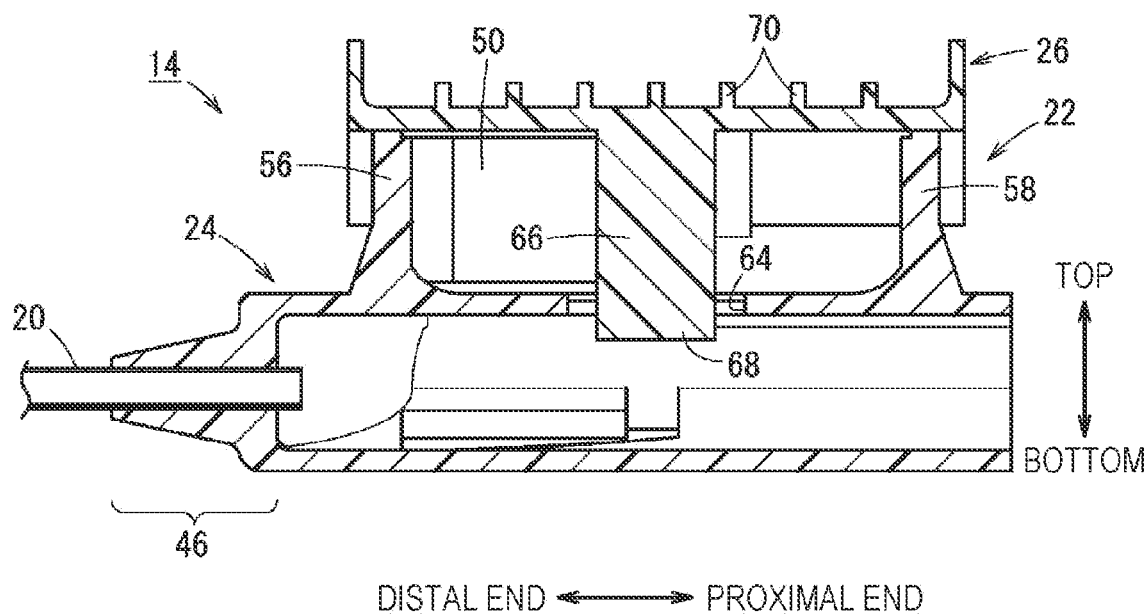
FIG. 6B is a cross-sectional view of the inner needle hub taken along line IVB-IVB in FIG. 5A.

As illustrated in FIG. 6B, the attachment projection 66 is a projection to be inserted into the attachment hole 64 of the needle holding portion 24. As illustrated in FIG. 6A, an anchor portion 68 protruding wider than the attachment hole 64 is formed at a distal end of the attachment projection 66 in order to prevent the attachment projection 66 from falling off from the attachment hole 64. As illustrated in FIG. 6B, the attachment projection 66 of the slider 26 is formed to have a shorter axial length than the attachment hole 64 of the needle holding portion 24, and the slider 26 is provided with play that can be displaced by a predetermined range in the axial direction with respect to the needle holding portion 24 in a state of being attached to the needle holding portion 24. When the slider 26 is moved with respect to the needle holding portion 24 using this play, the inclined surfaces 76a and 76b of the release projection 74 in FIG. 6A can displace the stopper projections 60 and 62 of the needle holding portion 24 inward, and can release the engagement state with the first recess 34 (or the second recess 36) of the guide groove 32.

Hereinafter, an operation of the puncture needle 10 of the present embodiment will be described together with a usage method thereof.

The puncture needle 10 is provided in a state in which the inner needle assembly 14 is inserted into the outer needle assembly 12 as illustrated in FIG. 1. However, in order to prevent erroneous puncture of the needle tip 10a during storage and conveyance, in the initial state, as illustrated in FIG. 3B, the distal end portion 20a of the inner needle 20 is in the second state of being accommodated proximal of the distal end portion 16a of the outer needle 16 (blunt needle).

In the second state, as illustrated in FIG. 7A, the stopper projection 60 and the stopper projection 62 of the needle holding portion 24 are engaged with the second recesses 36 of the guide groove 32 of the outer needle hub body 30. The stopper projection 60 is pressed against the one second recess 36 by a resilient force of the first arm 50, and the stopper projection 62 is pressed against the other second recess 36 by a resilient force of the second arm 52. Therefore, the position of the needle holding portion 24 in the axial direction is fixed to a second position by the stopper projections 60 and 62 and the second recesses 36. That is, the stopper projections 60 and 62, the first arm 50, the second arm 52, and the second recesses 36 constitute the lock mechanism 25 at the second position.

The user first performs an operation of protruding the distal end portion 20a of the inner needle 20 from the distal end portion 16a of the outer needle 16. As illustrated in FIG. 7B, this operation is performed when the user holds the outer needle hub body 30 with one hand, puts the thumb on the slider 26, and moves the slider 26 forward toward the distal end.

As illustrated in FIG. 8A, when the user advances the slider 26 toward the distal end, the slider 26 is displaced toward the distal end side with respect to the needle holding portion 24 due to axial play between the slider 26 and the needle holding portion 24. As a result, the tapered portions 76 of the release projections 74 are displaced toward the distal end side, and the inclined surfaces 76b on a rear end side abut on the stopper projections 60 and 62. As the slider 26 further advances, the stopper projections 60 and 62 are displaced inward in the width direction along the inclined surfaces 76b. As a result, the engagement state between the stopper projections 60 and 62 and the second recesses 36 is released. As a result, the needle holding portion 24 can be displaced in the axial direction.

As illustrated in FIG. 8B, a distal end edge of the attachment projection 66 of the slider 26 abuts on the distal end of the attachment hole 64, and the needle holding portion 24 advances toward the distal end together with the slider 26. The stopper projections 60 and 62 are displaced in the axial direction while sliding on the inclined surfaces 38b and 38c of the first convex portions 38 of the guide groove 32. Note that, when the thumb is released from the slider 26 before exceeding the top portions 38a of the first convex portions 38, the stopper projection 60 biased by the first arm 50 and the stopper projection 62 biased by the second arm 52 slide toward the second recesses 36 along the inclined surfaces 38c, and the needle holding portion 24 retreats to the proximal end side. Then, when the stopper projections 60 and 62 are engaged with the second recesses 36, the needle holding portion 24 stops.

Figure 9A:
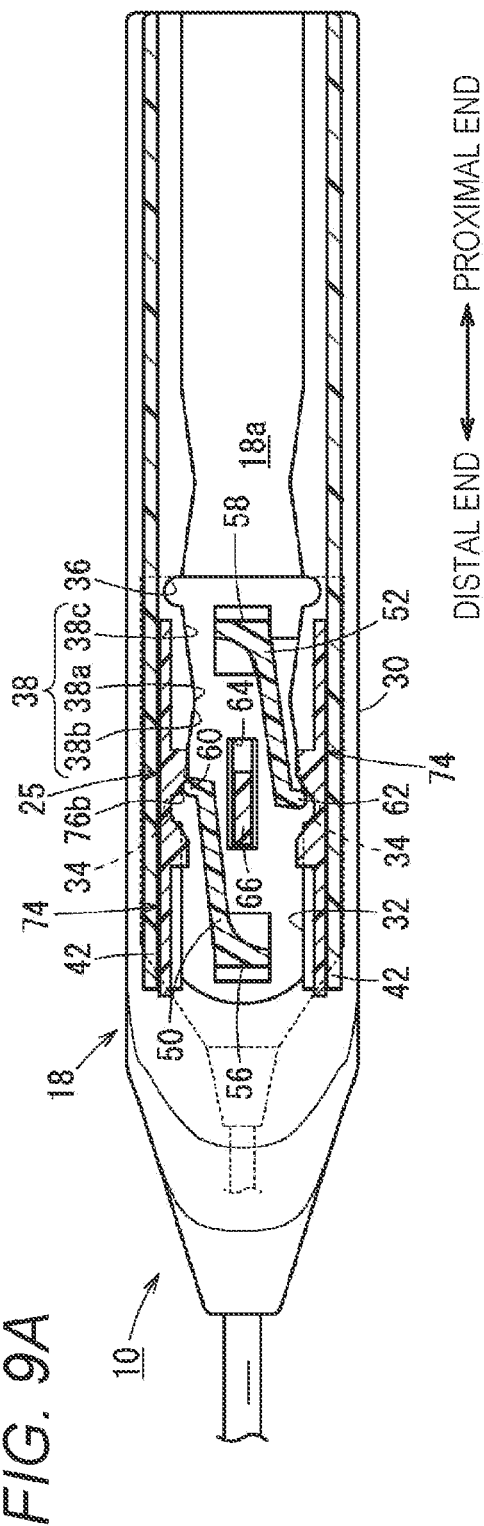
FIG. 9A is a cross-sectional view illustrating a state in which the inner needle hub moves to a first position and the stopper projection engages with a first recess.
Figure 9B:
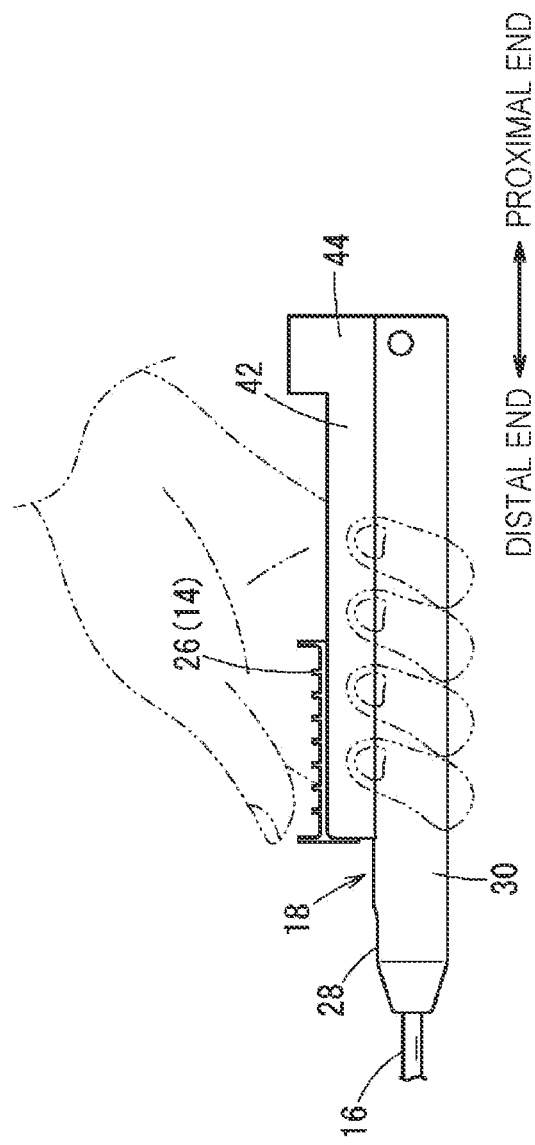
FIG. 9B is a side view illustrating a position of the slider in FIG. 9A.

As illustrated in FIG. 9A, when the needle holding portion 24 is advanced toward the distal end through the slider 26, the stopper projections 60 and 62 climb over the top portions 38a of the first convex portions 38 of the guide groove 32 and move to the distal end side, and are displaced to a first position engaged with the first recesses 34. Thereafter, when the stopper projections 60 and 62 are engaged with the first recesses 34, vibration (impact) is generated, and the vibration is transmitted to the user's hand as a click feeling. The user can recognize that the needle tip 10a is switched to the first state (sharp) from the click feeling transmitted to the hand. Therefore, as illustrated in FIG. 3A, the sharp distal end portion 20a protrudes from the distal end portion 16a of the outer needle 16. As illustrated in FIGS. 9A and 9B, the slider 26 comes into contact with the distal end side of the guide groove 32 of the outer needle hub body 30 and stops at the first position.

Note that, when the stopper projections 60 and 62 pass over the top portions 38a of the first convex portions 38 and move toward the inclined surfaces 38b, the resilient forces of the first arm 50 and the second arm 52 act, and thus, thrust toward the first recesses 34 is generated in the slider 26 and the needle holding portion 24. Therefore, even when the user releases the thumb from the slider 26, the needle holding portion 24 is spontaneously displaced in the distal direction until the stopper projections 60 and 62 are engaged with the first recesses 34.

As illustrated in FIG. 10A, at the first position, the stopper projections 60 and 62 are engaged with the first recesses 34 in a state of being pressed by the resilient forces of the first arm 50 and the second arm 52. As illustrated in an enlarged manner in FIG. 10B, flat surfaces perpendicular to the axial direction are provided at the distal end and the proximal end of the first recesses 34, and flat surfaces perpendicular to the axial direction are also formed on the proximal end sides of the stopper projections 60 and 62. Therefore, even in a case in which a load to displace the inner needle 20 toward the proximal end side acts on the inner needle 20 by puncturing the skin 100 with the inner needle or the like, the stopper projections 60 and 62 are not detached from the first recesses 34. Therefore, even if a load in the axial direction acts on the inner needle 20, the needle holding portion 24 is not displaced from the first position and is held at the first position. At the first position, the stopper projections 60 and 62, the first arm 50, the second arm 52, and the first recesses 34 constitute the lock mechanism 25.

Figure 11A:
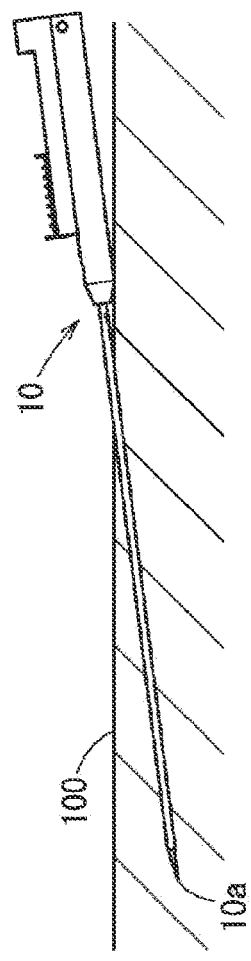
FIG. 11A is an explanatory diagram illustrating an operation of puncturing a living tissue with the puncture needle of FIG. 1.

Thereafter, the user removes the thumb from the slider 26 and punctures the skin 100 of the patient (living body) with the needle tip 10a of the puncture needle 10 as illustrated in FIG. 11A. After puncturing a subcutaneous tissue, the user operates the slider 26 to switch the needle tip 10a between the first state (sharp) and the second state (blunt). That is, when the slider 26 is pulled toward the proximal end side, the release projections 74 of the slider 26 move toward the proximal end side from the state illustrated in FIG. 10A, and the inclined surfaces 76a on the distal end side of the release projections 74 abut on the stopper projections 60 and 62. Then, as the inclined surfaces 76a move to the proximal end side, the stopper projections 60 and 62 are pushed back inward, the engagement of the stopper projections 60 and 62 with the first recesses 34 is released, and the needle holding portion 24 can move to the proximal end side.

By further sliding the slider 26 toward the proximal end side, the needle holding portion 24 moves toward the proximal end side, and stops at the second position where the stopper projections 60 and 62 are engaged with the second recesses 36 as illustrated in FIG. 7A. As a result, as illustrated in FIG. 3B, the distal end portion 20a of the inner needle 20 is pulled into the proximal end side of the distal end portion 16a of the outer needle 16, and the needle tip 10a of the puncture needle 10 is switched to the second state (blunt). When the stopper projections 60 and 62 are engaged with the second recesses 36, light vibration is transmitted to the user's hand as a click feeling. As a result, even in a state in which the user cannot see the needle tip 10a of the puncture needle 10, the user can recognize that the needle tip 10a has been switched to the second state (blunt).

Note that, in the middle of moving the needle holding portion 24 from the first position to the second position, the stopper projections 60 and 62 abut on the inclined surfaces 38b and 38c of the first convex portions 38 of the guide groove 32 while being pressed. Therefore, the thrust toward the first position acts on the needle holding portion 24 until the stopper projections 60 and 62 exceed the top portions 38a. Furthermore, after the stopper projections 60 and 62 move to the proximal end side beyond the top portions 38a, a thrust toward the second position acts. Therefore, because the needle holding portion 24 stops at only one of the first position and the second position, even in a state in which the state of the needle tip 10a of the puncture needle 10 cannot be visually recognized, the user can easily confirm whether the needle tip 10a is sharp or blunt.

The user advances the puncture needle 10 to the target site of the living tissue while switching the needle tip 10a of the puncture needle 10 between the first state (sharp) and the second state (blunt).

Figure 11B:
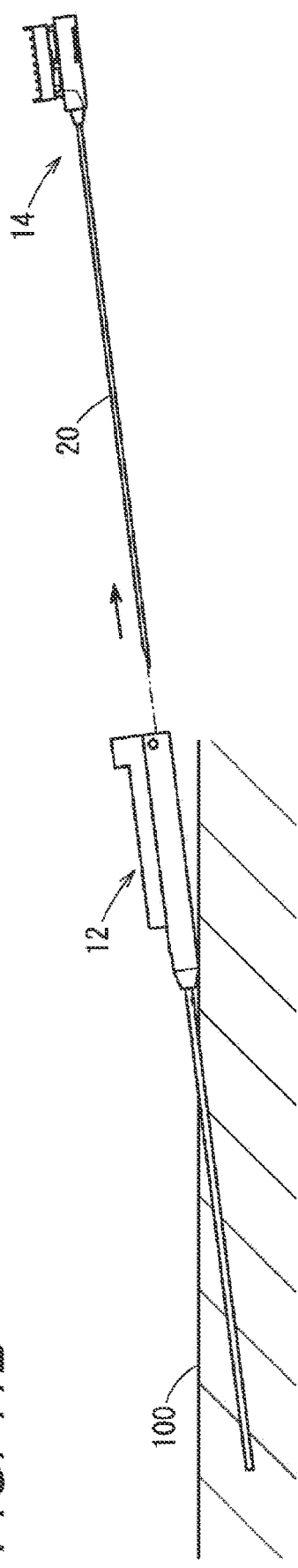
FIG. 11B is an explanatory view illustrating an operation of detaching the inner needle after the puncture of the puncture needle is completed.

As illustrated in FIG. 11B, after the needle tip 10a of the puncture needle 10 reaches the target position, the user pulls out the inner needle assembly 14 from the outer needle assembly 12.

Figure 12:
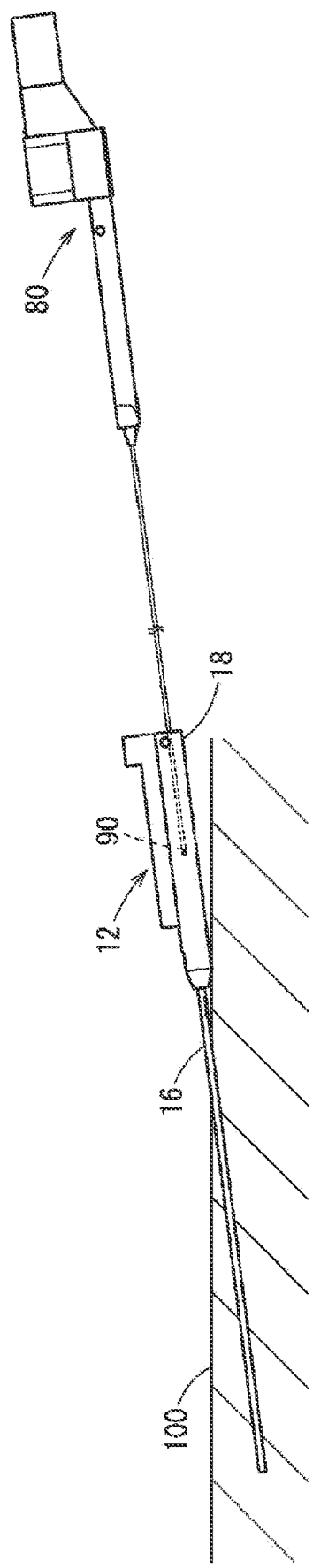
FIG. 12 is an explanatory view illustrating an operation of attaching an indwelling instrument to the outer needle assembly of the puncture needle of FIG. 1.

Thereafter, as illustrated in FIG. 12, the user inserts an indwelling instrument 80 holding the implanted body 90 (for example, collagen fibers and the like) at the distal end from the proximal end portion of the outer needle assembly 12.

Figure 13A:
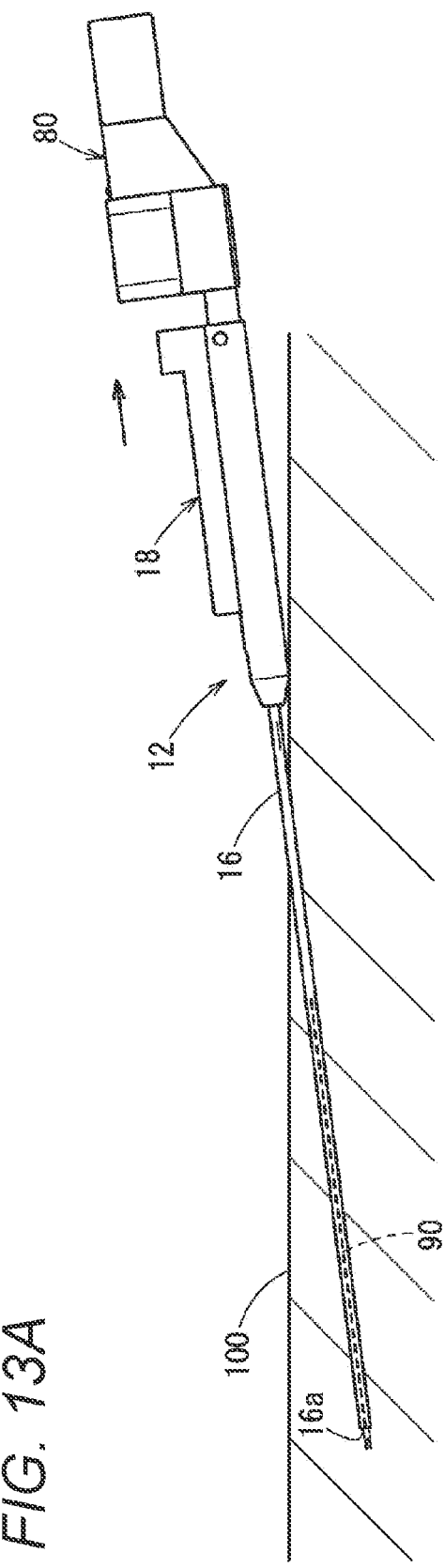
FIG. 13A is an explanatory view illustrating an operation of feeding an implanted body to a target site.
Figure 13B:
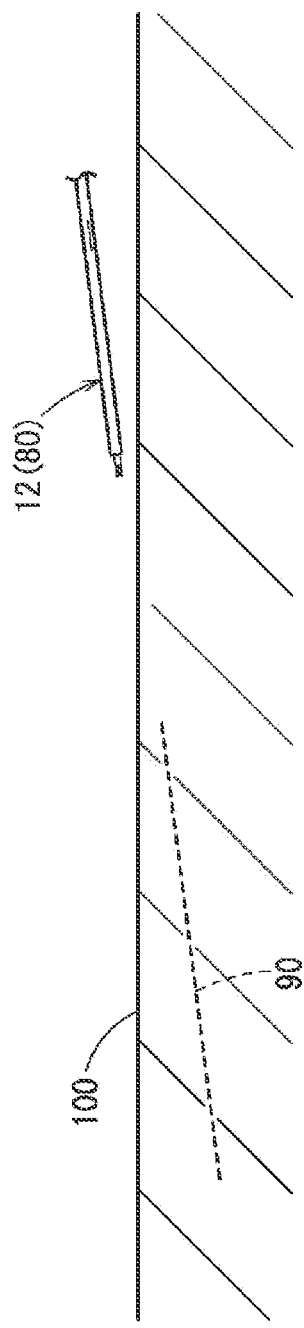
FIG. 13B is an explanatory view illustrating an operation of withdrawing the indwelling instrument together with the outer needle of the puncture needle while leaving the implanted body in the living tissue.

As illustrated in FIG. 13A, the user causes the distal end of the indwelling instrument 80 to protrude from the distal end portion 16a of the outer needle 16 of the outer needle assembly 12, and pulls out the outer needle assembly 12 from the skin 100 of the living body together with the indwelling instrument 80 as illustrated in FIG. 13B. As a result, the implantation of the implanted body 90 into the living tissue is completed.

MODIFIED EXAMPLE

Figure 14A:
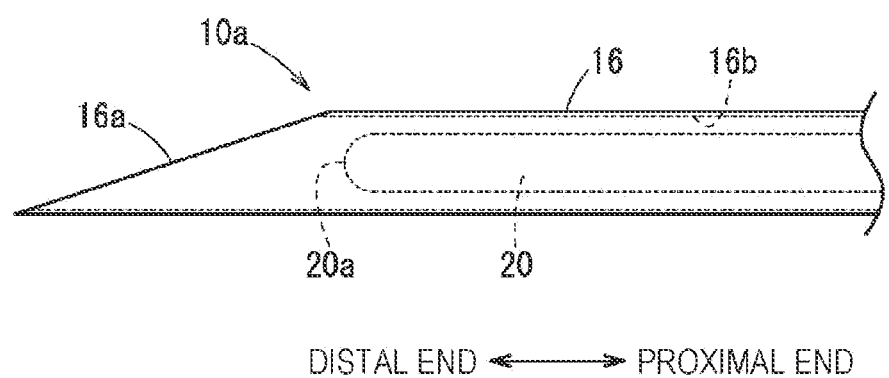
FIG. 14A is an enlarged view of a needle tip of a puncture needle according to a modified example of the embodiment in a first state (sharp)
Figure 14B:
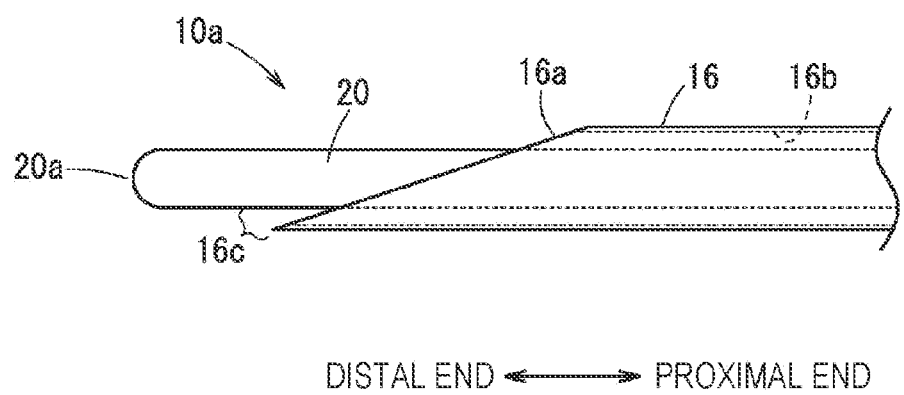
FIG. 14B is an enlarged view of the needle tip of the puncture needle in FIG. 14A in a second state (blunt).

Hereinafter, a modified example of the puncture needle 10 of the present embodiment will be described. As illustrated in FIGS. 14A and 14B, in the needle tip 10a according to the modified example, the distal end portion 20a of the inner needle 20 is a blunt needle formed in a spherical shape, and the distal end portion 16a of the outer needle 16 has a sharp cutting edge obliquely cut off with respect to the axial direction.

In the present modified example, a state in which the distal end portion 20a of the inner needle 20 protrudes more than the distal end portion 16a of the outer needle 16 as illustrated in FIG. 14B is the second state (blunt), and a state in which the distal end portion 20a of the inner needle 20 is pulled toward the proximal end side than the distal end portion 16a of the outer needle 16 is the first state (sharp) as illustrated in FIG. 14A.

Figure 15:
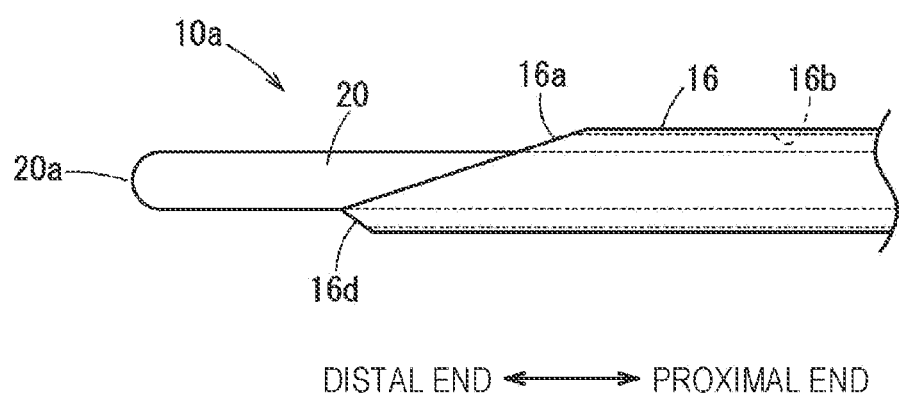
FIG. 15 is an enlarged view illustrating an example in which a backcut portion is provided in the puncture needle of FIG. 14B.

Note that, in the second state of FIG. 14B, a spaced portion 16c is formed between the inner needle 20 and a blade edge of the distal end portion 16a of the outer needle 16, and when a blood vessel, a nerve, or the like enters the space, these tissues may be damaged by the sharp blade edge. Therefore, in the present modified example, as illustrated in FIG. 15, the spaced portion 16c (see FIG. 14B) may be minimized by providing a backcut portion 16d in the vicinity of the blade edge of the distal end portion 16a of the outer needle 16.

The puncture needle 10 of the present embodiment has the following effects.

The puncture needle 10 of the present embodiment includes the outer needle 16 having the lumen 16b extending in the axial direction, the outer needle hub 18 joined to the proximal end portion of the outer needle 16, the inner needle 20 inserted into the lumen 16b of the outer needle 16 via the outer needle hub 18, the switching mechanism 23 capable of switching between a first state in which the inner needle 20 is displaced in the axial direction and the needle tip 10a is sharp and a second state in which the needle tip 10a is blunt, and the lock mechanism 25 that maintains the position of the inner needle 20.

According to the puncture needle 10, the needle tip 10a can be switched between the sharp first state and the blunt second state. Therefore, it is possible to advance in the living tissue while preventing damage to blood vessels, nerves, and the like. Furthermore, because the lock mechanism 25 is provided, the needle tip 10a is not switched from the first state to the second state in the middle of the puncture, so that the user can concentrate on the puncture operation.

In the puncture needle 10 described above, the distal end portion 20a of the inner needle 20 may be sharp, and the distal end portion 16a of the outer needle 16 may be blunt. In this case, a state in which the distal end portion 20a of the inner needle 20 protrudes more than the distal end portion 16a of the outer needle 16 becomes the sharp first state.

In the puncture needle 10 described above, the distal end portion 16a of the outer needle 16 may be sharp, and the distal end portion 20a of the inner needle 20 may be blunt. In this case, a state in which the distal end portion 20a of the inner needle 20 is pulled toward the proximal end side of the distal end portion 16a of the outer needle 16 is the sharp first state. In this case, the backcut portion 16d may be provided at the distal end portion 16a of the outer needle 16. This can prevent damage to tissues such as blood vessels and nerves.

The puncture needle 10 described above may further include the inner needle hub 22 provided at the proximal end of the inner needle 20 and inserted into the outer needle hub 18, and the switching mechanism 23 may include the guide groove 32 that is provided in the outer needle hub 18 and guides the inner needle hub 22 in the axial direction, the first recess 34 that is provided in the guide groove 32 and positions the inner needle hub 22 at the first position, the second recess 36 that is provided on the proximal end side of the first recess 34 and positions the inner needle hub 22 at the second position, and the stopper projections 60 and 62 provided in the inner needle hub 22 and protruding from the inner needle hub 22 toward the guide groove 32 while being elastically biased, and engaging with the first recesses 34 and the second recesses 36.

According to this configuration, the stopper projections 60 and 62 are engaged with the first recesses 34 or the second recesses 36, so that the needle tip 10a can be switched between the first state and the second state. Furthermore, because the user can recognize the switching between the first state and the second state without confirming the hand by the click feeling when the stopper projections 60 and 62 are engaged with the first recesses 34 or the second recesses 36, the user can easily handle the puncture needle 10.

In the puncture needle 10 described above, the inner needle hub 22 may include the slider 26 provided in the inner needle hub 22, and the slider 26 may be configured to release the engagement between the stopper projections 60 and 62 and the first recesses 34 or the second recesses 36 by pulling the stopper projections 60 and 62 inward. According to this configuration, the user can easily move the inner needle hub 22 through the operation of the slider 26.

In the puncture needle 10 described above, the first recesses 34 and the second recesses 36 may be provided with the step portions 34a and 36a that prevent detachment of the stopper projections 60 and 62. According to this configuration, even if a load in the axial direction acts on the inner needle 20, the movement of the inner needle hub 22 can be prevented, and the first state or the second state can be maintained.

In the puncture needle 10 described above, the guide groove 32 may be provided with inclined surfaces 38b, 38c, and 40b that guide the stopper projections 60 and 62 to the first recesses 34 or the second recesses 36. According to this configuration, because the inner needle hub 22 is spontaneously displaced to the first position or the second position, it is possible to prevent the inner needle hub 22 from stopping in an unknown state in the middle of the first state or the second state of the needle tip 10a of the puncture needle 10, so that the handleability of the puncture needle 10 is improved.

Although the present invention has been described above with reference to preferred embodiments, the present invention is not limited to the above embodiments, and it goes without saying that various modifications can be made without departing from the gist of the present invention.

The invention claimed is:

1. A puncture needle comprising:
   an outer needle including a lumen extending in an axial direction;
   an outer needle hub joined to a proximal end portion of the outer needle;
   an inner needle located in the lumen of the outer needle;
   an inner needle hub located at a proximal end of the inner needle inside the outer needle hub; and
   a switching mechanism configured to switch between a first state in which a needle tip of the puncture needle is sharp and a second state in which the needle tip of the puncture needle is blunt by displacing the inner needle in the axial direction, wherein the switching mechanism comprises:
      a guide groove that is located in the outer needle hub and is configured to guide the inner needle hub in the axial direction,
      a recess that is located in the guide groove and is configured to position the inner needle hub at a first position, and
      a stopper projection located on the inner needle hub, protruding from the inner needle hub toward the guide groove while being elastically biased, and configured to engage with the recess.

2. The puncture needle according to claim 1, wherein a distal end of the inner needle is sharp, and a distal end of the outer needle is blunt.

3. The puncture needle according to claim 2, wherein:
   the recess is a first recess, and
   the switching mechanism further comprises a second recess that is located on a proximal end side of the first recess and is configured to position the inner needle hub at a second position, and
   the stopper projection is configured to engage with the first recess and the second recess.

4. The puncture needle according to claim 1, wherein a distal end of the outer needle is sharp, and a distal end of the inner needle is blunt.

5. The puncture needle according to claim 4, wherein a backcut portion is formed at the distal end of the outer needle.

6. The puncture needle according to claim 5, wherein:
   the recess is a first recess, and
   the switching mechanism further comprises a second recess that is located on a proximal end side of the first recess and is configured to position the inner needle hub at a second position, and
   the stopper projection is configured to engage with the first recess and the second recess.

7. The puncture needle according to claim 4, wherein:
   the recess is a first recess, and
   wherein the switching mechanism further comprises and a second recess that is located on a proximal end side of the first recess and is configured to position the inner needle hub at a second position, and
   the stopper projection is configured to engage with the first recess and the second recess.

8. The puncture needle according to claim 1, wherein:
   the recess is a first recess, and
   the switching mechanism further comprises a second recess that is located on a proximal end side of the first recess and is configured to position the inner needle hub at a second position, and
   the stopper projection is configured to engage with the first recess and the second recess.

9. The puncture needle according to claim 8, wherein the inner needle hub comprises a slider configured to release engagement between the stopper projection and the first recess or the second recess by pulling the stopper projection inward.

10. The puncture needle according to claim 8, wherein the first recess and the second recess comprise a step portion configured to prevent detachment of the stopper projection.

11. The puncture needle according to claim 8, wherein the guide groove comprises an inclined surface configured to guide the stopper projection to the first recess or the second recess.

12. A method of operating a puncture needle, the method comprising:
   providing the puncture needle, which comprises:
      an outer needle including a lumen extending in an axial direction, wherein a distal end of the outer needle is blunt,
      an outer needle hub joined to a proximal end portion of the outer needle,
      an inner needle located in the lumen of the outer needle, wherein a distal end of the inner needle is sharp,
      an inner needle hub located at a proximal end of the inner needle inside the outer needle hub, and
   a switching mechanism comprising:
      a guide groove that is located in the outer needle hub and is configured to guide the inner needle hub in the axial direction,
      a recess that is located in the guide groove and is configured to position the inner needle hub at a first position, and
      a stopper projection located on the inner needle hub, protruding from the inner needle hub toward the guide groove while being elastically biased, and configured to engage with the recess,
   protruding a distal end portion of the inner needle from a distal end portion of the outer needle such that the guide groove guides the inner needle hub to the first position at which the stopper projection engages with the recess;

while the distal end portion of the inner needle is located distal of the distal end portion of the outer needle, puncturing skin of a patient with the sharp distal end of the inner needle;

operating the switching mechanism to pull the distal end portion of the inner needle in an axial direction to a position proximal of the distal end portion of the outer needle; and advancing the puncture needle to a target site of the living tissue.

13. A method of operating a puncture needle, the method comprising:

providing the puncture needle, which comprises:

an outer needle including a lumen extending in an axial direction, wherein a distal end of the outer needle is sharp, an outer needle hub joined to a proximal end portion of the outer needle, an inner needle located in the lumen of the outer needle, wherein a distal end of the inner needle is blunt, an inner needle hub located at a proximal end of the inner needle inside the outer needle hub, and a switching mechanism comprising:

a guide groove that is located in the outer needle hub and is configured to guide the inner needle hub in the axial direction, a recess that is located in the guide groove and is configured to position the inner needle hub at a first position, and a stopper projection located on the inner needle hub, protruding from the inner needle hub toward the guide groove while being elastically biased, and configured to engage with the recess, protruding a distal end portion of the outer needle from a distal end portion of the inner needle such that the guide groove guides the inner needle hub to the first position at which the stopper projection engages with the recess;

while the distal end portion of the outer needle is located distal of the distal end portion of the inner needle, puncturing skin of a patient with the sharp distal end of the outer needle;

operating the switching mechanism to pull the distal end portion of the outer in an axial direction to a position proximal of the distal end portion of the inner needle; and advancing the puncture needle to a target site of the living tissue.

\* \* \* \* \*